US006984095B2

(12) United States Patent
Johnson

(10) Patent No.: US 6,984,095 B2
(45) Date of Patent: Jan. 10, 2006

(54) CARGO HOOK TIE-DOWN DEVICE

(75) Inventor: Lawrence W. Johnson, Taylor, MI (US)

(73) Assignee: Illinois Tool Works Inc., Glenview, IL (US)

( * ) Notice: Subject to any disclaimer, the term of this patent is extended or adjusted under 35 U.S.C. 154(b) by 37 days.

(21) Appl. No.: 10/985,498

(22) Filed: Nov. 10, 2004

(65) Prior Publication Data
US 2005/0244242 A1 Nov. 3, 2005

Related U.S. Application Data

(63) Continuation-in-part of application No. 29/217,410, filed on May 3, 2004.

(51) Int. Cl.
B61D 45/00 (2006.01)
(52) U.S. Cl. ...................................... 410/101
(58) Field of Classification Search ................ 410/101, 410/106, 108, 110, 115, 116; 24/265 CD, 24/115 K; 248/499
See application file for complete search history.

(56) References Cited

U.S. PATENT DOCUMENTS

| 1,535,982 | A | * | 4/1925 | Carr ................................ 16/4 |
| 1,608,177 | A | * | 11/1926 | Johnson ........................... 16/4 |
| 1,871,963 | A | * | 8/1932 | Dill ............................ 403/302 |
| 2,836,141 | A | * | 5/1958 | Brydon ........................ 114/218 |
| 3,323,772 | A | * | 6/1967 | Dupree et al. .............. 248/499 |
| 3,399,589 | A | * | 9/1968 | Breed ........................... 411/428 |
| 3,452,636 | A | * | 7/1969 | Cohen et al. ............. 411/371.1 |
| 4,407,477 | A | * | 10/1983 | Backlund et al. ........... 248/499 |
| 4,607,990 | A | * | 8/1986 | Eggers ........................... 410/2 |
| 4,699,410 | A | * | 10/1987 | Seidel ......................... 294/1.1 |
| 4,701,088 | A | * | 10/1987 | Crull .......................... 411/369 |
| 4,762,449 | A | * | 8/1988 | St. Pierre et al. ........... 410/107 |
| 5,622,464 | A | * | 4/1997 | Dill et al. ................... 411/399 |
| 5,674,033 | A |   | 10/1997 | Ruegg |
| 5,738,471 | A | * | 4/1998 | Zentner et al. ............. 410/110 |
| 5,774,948 | A | * | 7/1998 | Petschke et al. ....... 24/265 CD |
| 5,775,664 | A | * | 7/1998 | Martin ....................... 248/500 |
| 6,113,328 | A |   | 9/2000 | Claucherty ................. 410/106 |
| 6,231,286 | B1 | * | 5/2001 | Bogatz et al. ............ 411/371.1 |
| 6,536,726 | B1 | * | 3/2003 | Tull ......................... 248/188.8 |
| 6,712,568 | B2 | * | 3/2004 | Snyder et al. ............. 410/104 |
| 6,848,873 | B1 | * | 2/2005 | Husk .......................... 410/115 |
| 2002/0014569 | A1 | * | 2/2002 | Pearl .......................... 248/499 |
| 2002/0100147 | A1 | * | 8/2002 | Larsen et al. ................ 24/298 |
| 2004/0113039 | A1 | * | 6/2004 | Becker ....................... 248/499 |

FOREIGN PATENT DOCUMENTS

EP 1 415 855 A1 5/2004

\* cited by examiner

Primary Examiner—H. Gutman
(74) Attorney, Agent, or Firm—Mark W. Croll; Paul F. Donovan

(57) ABSTRACT

A tie-down device that may be used in or on a vehicle, equipment or other structure to mount cargo or other objects to the vehicle, equipment or other structure includes mounting openings, a structural hem that surrounds at least a portion of the tie-down device, and a structural bead that surrounds at least a portion of the mounting openings. The configuration of the structural hem and the structural bead improves the positioning and alignment of mounting fasteners through the mounting openings and also improves the securement of the tie-down device to the vehicle, equipment or other structure.

19 Claims, 3 Drawing Sheets

CARGO HOOK TIE-DOWN DEVICE

CROSS-REFERENCE TO RELATED APPLICATION AND FIELD OF THE INVENTION

This application is a continuation-in-part of U.S. application Ser. No. 29/217,410, filed on May 3, 2004. The present invention relates generally to devices used to secure cargo or other objects to a vehicle or other structure. More specifically, this invention relates to tie-down devices that may be used in or on vehicles or in other applications to secure cargo or other objects.

BACKGROUND OF THE INVENTION

Tie-down devices are known and have been used for many years within or on a vehicle. The known tie-down devices generally are fastened to a vehicle and include an eyelet for receiving a line or rope to secure cargo or an object in or on a vehicle.

There are however some drawbacks with known tie-down devices. For example, the manufacturing costs for making the known tie-down devices are high. That is, many tie-down devices are forged, using an expensive manufacturing process. These manufacturing costs are, unfortunately, passed down to the customer. With relatively high costs, a customer is easily discouraged from purchasing several tie-downs devices, which, if bought, would increase cargo flexibility in a vehicle.

SUMMARY OF THE INVENTION

The present invention is directed to a tie-down device that may be used in or on a vehicle, equipment or other structure. The tie-down device may be constructed from steel that is lightweight and offers high strength capabilities. The tie-down device includes openings to accommodate a variety of installations methods. In addition, a structural hem surrounds at least a portion of the tie-down device, providing stability while presenting a receptive roundness that aids in preventing rusting. Also, a structural bead surrounds at least a portion of the openings that cooperate with the structural hem for positioning a corresponding mounting fastener.

Other features and advantages of the invention will become apparent to those skilled in the art upon review of the following detailed description, claims and drawings in which like numerals are used to designate like features.

Figure 1:
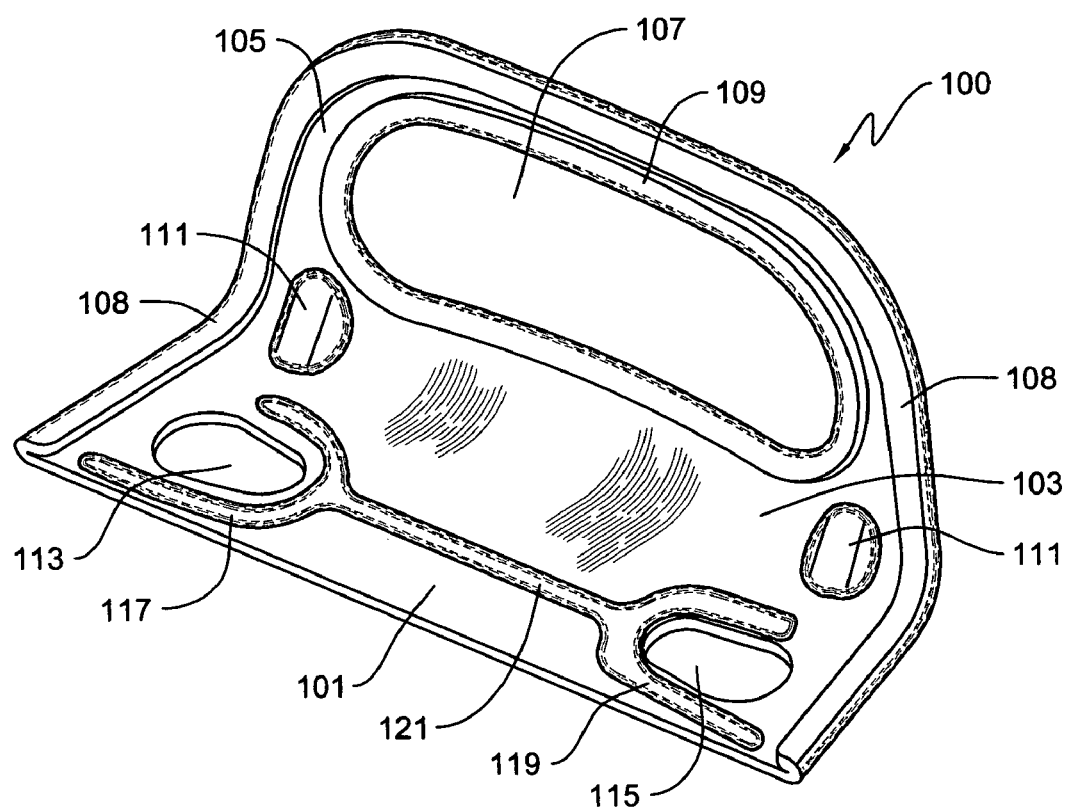
FIG. 1 is a perspective view of an exemplary tie-down device in accordance with an embodiment of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 2:
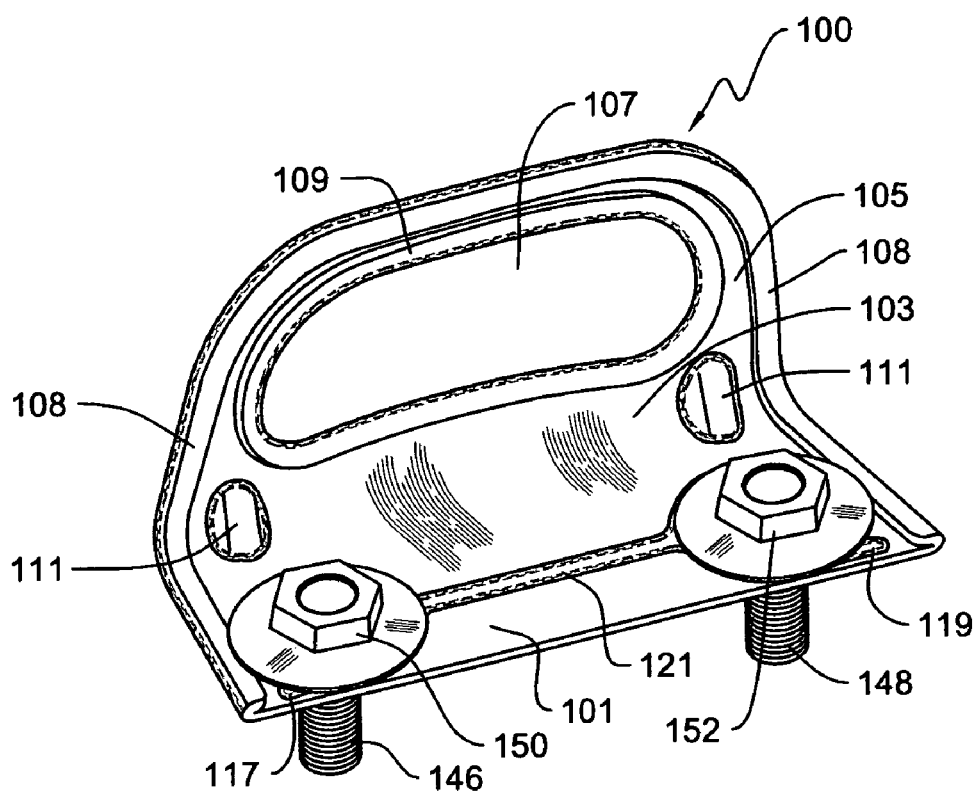
FIG. 2 is another perspective view of the tie-down device of FIG. 1.
Figure 3:
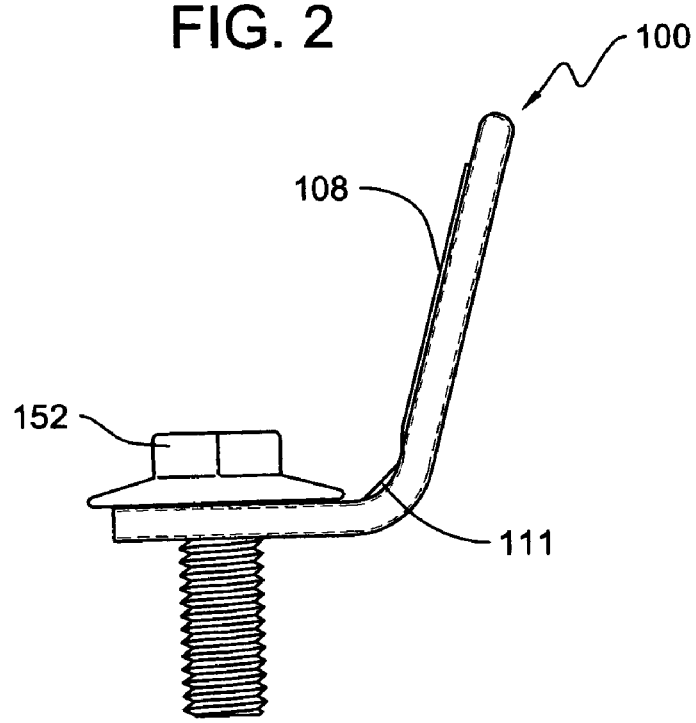
FIG. 3 is a side view of the tie-down device of FIG. 2.

Referring to the figures, there is illustrated in FIGS. 1–3 a tie-down device 100 in accordance with one embodiment of the invention. The tie-down device 100 has many applications, including securing cargo or objects in or to a vehicle or other structure. One skilled in the art will understand that the present invention has applications and uses outside of the described applications and uses.

In an exemplary embodiment, the tie-down device 100 includes a mounting region 101, a transition region 103, and a fastening region 105. The transition region 103 joins the mounting region 101 to the fastening region 105 and is shaped and configured to permit the mounting region 101 and fastening region 105 to extend in different planes. In one embodiment, the fastening region 105 extends angularly outward from the mounting region 101. One skilled in the art will understand that the fastening region 105 may extend outwardly at numerous angles relative to the mounting region 101.

The tie-down device 100, including the regions 101, 103, and 105 may be constructed from separate pieces of material that are joined together.

The fastening region 105 of the tie-down device 100 forms a fastening eyelet 107 or opening through the fastening region 105, which enables a user to tie-down cargo with a cargo hook, a rope or some other fastener by securing the hook, rope or fastener to the fastening eyelet 107. The present invention is not limited by the type of fastener that can be used to secure cargo or other objects. Rather, other types of fasteners or items to secure cargo may be used with the invention including bungee cords, line, wire, straps, hooks, and adhesive tapes. Moreover, the invention is not limited by the depicted shape of the eyelet or opening 107. Instead, the eyelet 107 may define numerous shapes and configurations and may comprise multiple openings or holes.

In an exemplary embodiment, a structural hem 108 is formed around the perimeter of the tie-down device 100 and along the edges of regions 101, 103, and 105 to provide structural strength to the tie-down device. The structural hem further provides a rounded, contoured edge to reduce sharp edges and the likelihood of rusting of the part. Additionally, a structural hem 109 is formed around the fastening eyelet 107 to provide additional strength in that region for securing a fastener through the fastening eyelet 107. Also, the hem 109 provides a rounded edge to reduce sharp edges in that region and to also reduce the chances of rusting in that region. As used herein, the term "structural hem" or "hem" is intended to broadly include any known hem, seam, rim, rib, raised edge, rounded edge, blunted edge, or reinforced edge that functions to either to provide structural reinforcement or rigidity or to reduce the sharpness of any edges on the tie-down device or to reduce the chances of rusting of the part.

The mounting region 101 of the tie-down device includes mounting holes 113 and 115. A corresponding bolt or fastener 146, 148 (FIG. 2) or some other fastening device may be used to anchor or secure the tie-down device 100 through the mounting holes 113 and 115 and to a vehicle surface or other structure. In an exemplary embodiment, the mounting holes 113 and 115 have tapered elliptical shapes to accept a variety of bolt or fastener sizes. The mounting holes 113 and 115 are shaped so that transverse and rotational movement of the tie-down device 100 is sufficiently limited. One skilled in the art will understand that other mounting hole shapes may be used including round, square, non-circular or polygon shaped holes, to name a few.

Referring to FIGS. 1 and 2, in one embodiment of the invention, the structural hem 108 continues along the edges of the mounting region 101. In this exemplary embodiment, structural bead sections 117 and 119 are formed around a portion of the mounting holes 113 and 115, respectively. The bead sections 117, 119 may be raised portions formed from the tie-down device or may be raised portions added to or incorporated with the tie-down device. In use, the bead sections 117 and 119 cooperate with the structural hem 108 to allow the head 150 of bolt 146, for example, to sit upon, in approximately a flat manner, the mounting region 101, as depicted in FIG. 2. In other words, the underside of the head 150 of the bolt or fastener 146 will extend from the structural bead section 117 to the structural hem 108. This configuration permits the bolt 146 to be mounted "square" to the mounting hole 113 to properly align the bolt 146 relative to the mounting hole 113. Similarly, the bead section 119 will cooperate with the hem 108 to permit the bolt head 152 of the bolt 148 to sit upon the bead section 119 and hem 108 and to properly align the bolt 148 with the mounting hole 115.

Stated another way, the bolt head 150 (or washer, if used) rests on structural hem 108 and structural bead section 117, while bolt head 152 rests on structural hem 108 and structural bead section 119. With this construction, the height of the structural hem 108 is approximately the same as the height of structural bead sections 117 and 119—the height being measured from the mounting region 101. Consequently, when the bolts 146, 148 are installed, the bolts will extend substantially perpendicular through the mounting holes, thereby aligning and squaring the bolts within the mounting holes.

A structural bead section 121 may extend between the bead sections 117 and 119 and provide additional structural integrity for the mounting region 101. As used herein, the terms "structural bead," "bead" or "bead section" is intended to broadly include any raised or elevated section that may be used to provide additional structural support or integrity to the tie-down device or to provide a raised or elevated surface or contact point to enhance or improve the mounting of a fastener or bolt to the tie-down device.

As indicated above, the transition region 103 connects the fastening region 105 and mounting region 101 so that the fastening region is angularly positioned relative to the mounting region 101. In an exemplary embodiment, the transition region 103 forms structural darts 111, or structural supports or gussets, to provide greater structural integrity to the tie-down device when forces are applied to the fastening region 105.

In an exemplary embodiment, the structural hems 108 and 109 provide additional structural integrity to the tie-down device. However, other embodiments of the invention may utilize structural hems 108 and 109 for other functional purposes including blunting edges to reduce the possibility of accidentally cutting a user and enhancing receptive roundness for paint adhesion to prevent rusting. While structural bead sections 117 and 119 cooperate with structural hem 108 to allow a head of a bolt (or washer, if used) to sit approximately flat on mounting region 101, the structural bead sections 117 and 119, in cooperation with the structural bead section 121, may also enhance the structural integrity of mounting section 101. In one embodiment, the structural darts or supports 111 also enhance the structural integrity of the tie-down device while also maintaining the angular positioning of the mounting region 101 and fastening region 105 when a force is applied to fastening region 105—a force resulting from securing down cargo or other objects.

Figure 4:
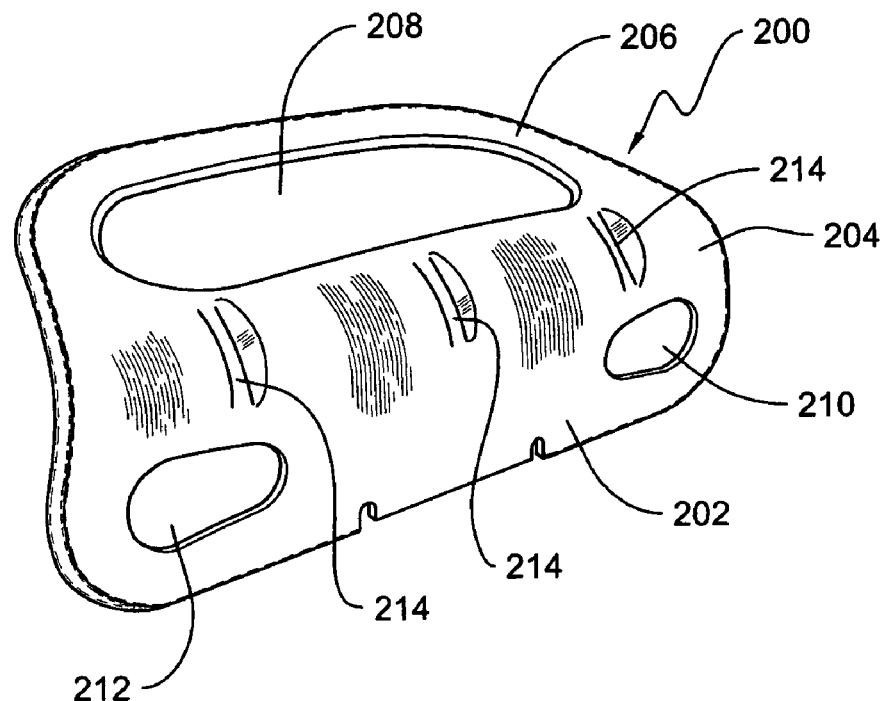
FIG. 4 is a perspective view of another exemplary tie-down device in accordance with an embodiment of the invention.
Figure 5:
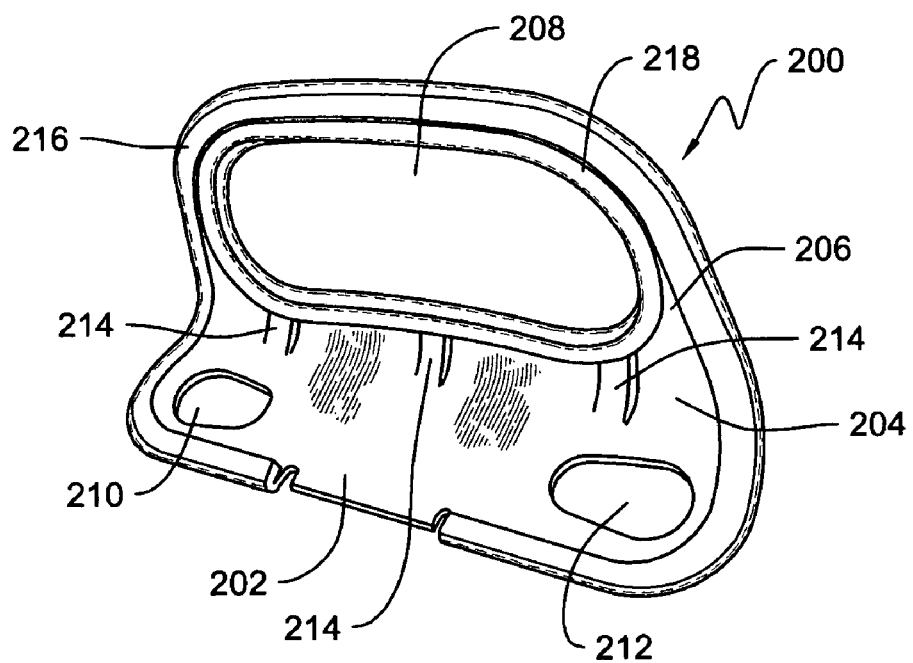
FIG. 5 is another perspective view of the tie-down device of FIG. 4.

Referring to FIGS. 4 and 5, there is depicted another embodiment of the tie-down device of the present invention. The tie-down device 200 includes a mounting region 202, a transition region 204 and a fastening region 206. Similar to the embodiment depicted in FIG. 1, the fastening region 206 includes at least one fastening eyelet or opening 208 that may used to receive and secure a cargo hook, line or rope to the tie-down device 100. Extending around the opening 208 is a structural hem 218 that may be used to provide additional strength in that region for securing a fastener through the fastening eyelet 208 and to provide a rounded edge to reduce sharp edges in that region and to also reduce the chances of rusting in that region.

The mounting region 202 may be anchored or secured to a vehicle surface, or other surface, with fastening devices, such as bolts, screws, rivets and so forth, as described above. The mounting region 202 of the tie-down device 200 includes mounting holes or openings 210, 212 to facilitate or provide for the securement of the tie-down device 200 to the vehicle or other structure. As depicted, the holes or openings 210, 212 have a tapered elliptical shape to accommodate various sized fastening devices and to prevent transverse and rotational movement of the tie-down device 200 after it has been secured in position. Again, other shapes and configurations of the holes or openings are possible with the invention.

The transition region 204 connects or joins the fastening region 206 and mounting region 202 so that the fastening region is angularly positioned relative to the mounting region. In an exemplary embodiment, the transition region 204 forms structural darts, gussets or supports 214 to provide greater structural integrity to the tie-down device when forces are applied to the fastening region 206.

In an exemplary embodiment, a structural hem 216 is formed around the perimeter of the tie-down device 100 and along the edges of regions 202, 204, and 206 to provide structural strength to the tie-down device. The hem 216 may include blunted or rounded edges to reduce the possibility of accidentally cutting of a user and improving paint adhesion to the surface to prevent rusting.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extend permitted by the prior art.

Various features of the invention are set forth in the following claims.

What is claimed is:

1. A tie-down device, comprising:
    a fastening region that forms a fastening eyelet;
    a mounting region that forms at least one mounting hole, that forms a first structural hem section along at least a portion of the mounting region, and that forms a structural bead section around at least a portion of the at least one mounting hole, wherein the structural bead section cooperates with the first structural hem section to allow a head of a fastener to sit on the structural hem section and the structural bead section; and
    a transition region that connects the fastening region and the mounting region.

2. The tie-down device of claim 1, wherein the fastening region, the mounting region, and the transition region are made from a single piece of material.

3. The tie-down device of claim 1, wherein the fastening region forms a second structural hem section along at least a portion of the fastening region.

4. The tie-down device of claim 3, wherein the second structural hem section is configured along an edge of the fastening region.

5. The tie-down device of claim 4, wherein the second structural hem section is configured around at least a portion of the fastening eyelet.

6. The tie-down device of claim 1, wherein the transition region forms at least one structural support between the fastening region and the mounting region.

7. The tie-down device of claim 1, wherein the transition region forms a third structural hem section along at least a portion of the transition region.

8. The tie-down device of claim 1, wherein the at least one mounting hole has a non-circular shape.

9. A tie-down device, comprising:
    a fastening region that forms a fastening eyelet;
    a mounting region that forms at least one mounting hole, that forms a first hem along an edge portion of the mounting region, that forms a raised portion around a portion of the at least one mounting hole, wherein a fastener couples the tie-down device to an external surface, and wherein the raised portion cooperates with the first hem to allow the fastener to sit on the raised portion and the first hem; and
    a transition region that connects the fastening region and the mounting region.

10. The tie-down device of claim 9, further comprising a second hem around an edge of the fastening region.

11. The tie-down device of claim 9, wherein the fastening region extends outwardly and in an angular direction from the mounting region.

12. The tie-down device of claim 9, further comprising a third hem around an edge of the transition region.

13. The tie-down device of claim 9, wherein the transition region includes at least one structural support.

14. The tie-down device of claim 9, wherein the at least one mounting hole has a non-circular shape.

15. A tie-down device, comprising:
    a fastening region that forms a fastening eyelet;
    a mounting region that forms at least two mounting holes, that forms a first hem along an edge portion of the mounting region, that forms a raised portion around a portion of the at least two mounting holes, wherein at least two fasteners sit on the raised portion; and
    a transition region that joins the fastening region and the mounting region.

16. The tie-down device of claim 15, further comprising a second hem around an edge of the fastening region.

17. The tie-down device of claim 15, wherein the at least two fasteners sit on the raised portion and the first hem.

18. The tie-down device of claim 15, wherein the raised portion also extends across the mounting region.

19. The tie-down device of claim 15, wherein the tie-down device includes at least one structural support.

* * * * *

UNITED STATES PATENT AND TRADEMARK OFFICE
CERTIFICATE OF CORRECTION

| | | |
|---|---|---|
| PATENT NO. | : 6,984,095 B2 | Page 1 of 1 |
| APPLICATION NO. | : 10/985498 | |
| DATED | : January 10, 2006 | |
| INVENTOR(S) | : Lawrence W. Johnson | |

It is certified that error appears in the above-identified patent and that said Letters Patent is hereby corrected as shown below:

In column 2, delete lines 30-32, and in their place, insert the following:

-- The tie-down device 100, including the regions 101, 103, and 105 may be constructed from a single sheet of metal, such as high-strength, lightweight steel, or other material such as plastic. Alternatively, the tie-down device 100 and regions 101, 103, and 105 may be constructed from separate pieces of material that are joined together. --

Signed and Sealed this

Twenty-ninth Day of August, 2006

JON W. DUDAS
*Director of the United States Patent and Trademark Office*